United States Patent [19]

Bousser

[11] Patent Number: 5,108,775
[45] Date of Patent: Apr. 28, 1992

[54] PROCESS FOR OBTAINING JUICES, OILS AND CAKES, IN STABLE FORMS, BY THE PRESSING OF FRESH PLANT PRODUCTS

[75] Inventor: Robert Bousser, Paris, France

[73] Assignee: Gattefosse S.A., France

[21] Appl. No.: 663,406

[22] Filed: Mar. 1, 1991

[30] Foreign Application Priority Data

Mar. 6, 1990 [FR] France .............................. 90 03069

[51] Int. Cl.$^5$ .............................................. A23L 2/04
[52] U.S. Cl. ................................ 426/616; 426/330.5; 426/617; 426/655; 426/615
[58] Field of Search .................... 426/615, 330.5, 489, 426/617, 655, 616

[56] References Cited

U.S. PATENT DOCUMENTS 4,661,363  4/1987  Gannis ................................ 426/655
4,996,070  2/1991  Nafisi-Movaghar ............... 426/655

FOREIGN PATENT DOCUMENTS 794050  4/1958  United Kingdom .............. 426/617

OTHER PUBLICATIONS

The American Heritage Dictionary 1982, Houghton Mifflin Co., p. 1082.

Primary Examiner—Carolyn Paden
Attorney, Agent, or Firm—Wall and Roehrig

[57] ABSTRACT

A process for obtaining juices, oils and cakes in stable form by the pressing of fresh plant products is disclosed in which a depressor system in the amount of two to two-and-a-half times the quantity of water contained in the product to be pressed is added to a quantity of crushed product. The depressor system is a mixture of dextrose, saccharose and salt in a proportion by weight of dextrose to saccharose of three times and sugars to salt between seven and seven-and-a-half times. The whole mixture is subjected to exhaustive crushing action to obtain a puree and the puree is then pressed to obtain the juices, oils and cakes in stable form.

11 Claims, No Drawings

PROCESS FOR OBTAINING JUICES, OILS AND CAKES, IN STABLE FORMS, BY THE PRESSING OF FRESH PLANT PRODUCTS

BACKGROUND OF THE INVENTION

The invention relates to a process for obtaining juices, oils and cakes, in stable forms, by the pressing of fresh plant products. It also relates to the juices, oils and cakes thus obtained.

The invention relates more particularly to a process which facilitates the extraction and the separation of juices, oils and cakes, and which automatically allows the resulting products of this pressing to be stabilized at the same time.

Although in what follows in the description and in the claims, the invention, most generally, is described with respect to its application to products of plant origin, such as plants, fruits, vegetables or spices, it may also be employed with products of animal origin.

The extraction of juices, oils and cakes is well known, notably in oenology, in the fruit juice industry, in sugar-refining or in oil-mills.

Most generally, the material from which the juices are extracted by pressing is previously crushed. The action of crushing, then pressing breaks open the cells, empties them of their contents (cytoplasm) and drains these contents together with the interstitial water from the product.

The more fluid the cytoplasm, the more abundant the interstitial water and the easier the extraction. Such is the case for raisins, oranges, and the like.

If on the other hand, as is frequently the case, the cytoplasm is more or less viscous because many of its molecules are colloids (proteins, amino acids, gums, pectin, cellulose, and the like) which swell and produce gels which are more or less thick with vacuolar and interstitial water, the extraction is more difficult. This is the case with apples, quinces, sugar-cane, and the like.

The same applies when the cytoplasm contains a lot of fatty substances, particularly emulsified with water. This is the case for olive pulp, coconut pulp, and the like.

One solution to these difficulties consists in "breaking", as best as possible, the gels and emulsions if they are not too abundant—after crushing and before pressing—by carrying out a substantial "trituration", in principle with rotating grinding wheels applies, olives, sugar-cane, and the like.

If these gels and emulsions are held together very tightly and are particularly abundant in oleaginous products, another solution consists in dehydrating by drying the corresponding products such as coconut which is dried to give copra, peanuts and the like. But in so doing, another disadvantage is met which is even found with naturally drying products peanuts, nuts, and the like, and which results from the fact that the vacuolar and interstitial water is, then, not very abundant, thereby still causing difficulties in extraction. This is resolved by employing very high pressure pressing equipment, named an "expeller", which is very expensive or else by employing solvent extraction techniques which are fairly sophisticated and costly as well. Furthermore, the oils obtained by these processes from often poorly dried products or form solvents must, more ore less necessarily, be "refined", that is to say, be subjected to sophisticated, expensive and very constraining new techniques, therefore to the detriment, a bit more, of their integrity. In this case, as well, the resulting cakes can be used, at best, only as animal feed, as fertilizer or as combustibles.

It should finally be noted that in all cases of extraction, the products obtained are not in stable forms and that they have to be stabilized one way or another: by alcoholic fermentation wines, by pasteurization for fruit juices, by dehydration for oils, cakes and the like. Generally, also, all the products are not recovered, in particular the water in oil-mills.

SUMMARY AND DESCRIPTION OF INVENTION

The invention palliates all these disadvantages. It relates to a process for obtaining juices, oils and cakes, in stable forms, by the pressing of fresh biological products, and normally comprises:

adding to these fresh products, in an amount of the order of two times to two and a half times the quantity of water contained in these products, a, drying and stabilizing extraction medium composed of a mixture comprising dextrose, sucrose and salt, and in which:

the proportion by weight of dextrose is of the order of three times that of sucrose;

the weight ratio between the sugars and the salt is between 7 and 7.5;

then subjecting the whole to a rapid and exhaustive crushing action, in order to obtain a puree;

and finally pressing this puree in order to obtain from it juices, oils and cakes, in stable forms.

Under these conditions, on the one hand, the extraction of juice is facilitated because the salt and the sugars, by virtue of their osmotic capacities and their electric charges significantly "break" the gels and the emulsions and, on the other hand, stable juices, oils and cakes are obtained (by virtue of the depressing capacities of the salt and the sugars), which are therefore easy to preserve and exhibit the essential properties of the initial products, as much in their integrity as in their integrality.

Still under these conditions, the flavor introduced by the mixture is relatively neutral, that is to say, neither salty nor sweet, the two flavors conveniently neutralising one another. But if a sweeter flavor is desired, it is enough to increase the proportion of sugars and to reduce that of salt. Inversely, if a rather salty flavor is desired, the proportion of sugars will be slightly reduced and that of salt will be increased.

The plant products processed are, normally freshly harvested or picked. Nevertheless, in a variant, the plants may have been, previously, very slightly withered.

As previously said, it is important that the sugars be composed of a mixture of dextrose and sucrose, in which the proportion of dextrose is of the order of three times that of sucrose. It was observed that if this ratio was lower than 2.5, the reducing function of the whole became insufficient. On the other hand, if this proportion becomes greater than 3.5, the excess dextrose no longer dissolves, and the sugar concentration of the whole risks becoming insufficient. Outside these limits, the stabilization of the products therefore risks not being properly ensured.

In an advantageous form of execution, part of the dextrose may be replaced by glycerol. This substitution is useful for applications in cosmetology, because it allows the "feel" of the product obtained on the skin to be improved. Although in theory the whole of the dextrose may be replaced by glycerol, in practice, for these applications, the best results are obtained by substituting, by weight, 25 to 50% of the dextrose by glycerol. On the other hand, for food applications, as provided for by law, the proportion of glycerol should not exceed 5% of the total weight of the finished product, in order to avoid secondary effects (diarrheas . . . ).

Likewise, it is important that the quantitative proportion of sugars relative to salt be of the order of seven to seven and a half parts of sugar to one part of salt, and preferably between 7.2 and 7.3, in order to obtain a product with a relatively neutral flavor.

Likewise, in order that the gels and the emulsions may be broken to the maximum and in order for the resulting products to be well stabilized, it is indispensable that the quantity of extraction medium introduced be of the order of two times to two and a half times the quantity of water contained in the fresh plant products to be processed. Although most generally, a quantity of the order of two times is sufficient, particularly with plant products which are relatively difficult to oxidize on the other hand, if the plant product is easily oxidizable, this quantity will be slightly higher and close to two and a half times.

In a preferred form of execution, the mixture of sugars also contains sorbitol, for example of the order of 2 to 5%. The addition of sorbitol advantageously slows the activity of non-enzymatic browning (Maillard reactions).

In another advantageous form of execution, up to one percent (1%) citric acid may be added, particularly to reduce the pH of the mixture, which enhances stabilization.

When very oxidizable plant products are processed, advantageously, during the characteristic crushing, traces of metabisulfite or of any other equivalent and authorized anti-oxidizing agent are added to the mixture.

Likewise, to avoid any risk of fungi appearing on the finished products, a fairly typical phenomenon on sweet products which are still humid, such as jams, some traces of sorbic acid or any other equivalent and authorized fungicidal agent may be added to the mixture.

To obtain such results, it can be advantageous to adopt for the extraction medium proportions of the order of:

| Components | For a sweet flavor | For a slightly salty flavor |
| --- | --- | --- |
| Dextrose | 68% | 62.5% |
| Sucrose | 23% | 20% |
| Sorbitol | 3% | 3% |
| Salt | 5% | 13.5% |
| Citric acid | 1% | 1% | the sum of the constituents being always equal to 100%.

As previously said, a substantial portion from quarter to one half, preferably one third of the dextrose may be replaced by glycerol.

In an advantageous form of execution, the extraction medium comprises by weight, of the order of:
  64% of a mixture of dextrose and glycerol, containing at most one-third glycerol,
  20% saccharose
  3% sorbitol
  12% salt (NaCl)
  1% citric acid, the sum of the constituents being always equal to 100%.

As previously said, depending on whether a more or less sweet flavor is desired, for example in the case where the finished product is intended for pâtisserie, the extraction medium is enriched in dextrose and sucrose. On the other hand, if a salty flavor is desired, for example for condimental or culinary products, the proportion of salt is then increased.

According to an essential feature of the invention, the mixing of the salt/sugars extraction medium with the biological product to be processed should be carried out by a rapid crushing operation. By "rapid crushing" is meant an intensive mechanical action, designed to break the molecules in order to obtain a homogeneous mixture, carried out at room temperature, for a relatively short duration, at most of the order of a few minutes, and in practice of the order of a minute. It is important that this operation does not cause heating of the mixture. Good results are obtained by employing shear action at room temperature, for example using a disk mill. Advantageously, the mixing of the depressor system and the biological product to be processed is carried out during the very action of rapid crushing, so as to obtain a puree and without resorting to external energy input.

According to another essential feature of the invention, the puree obtained after the crushing operation is pressed in order to extract its juices. This extraction is normally carried out using any known and appropriate simple means. For example, ordinary presses, decantations or centrifuges may be used. It is not necessary, in general, to resort to powerful and expensive equipment. The extraction phase can be improved by leaving the puree to sit at room temperature, for example for at least two to three hours, before the extraction. This is so that the mixed ingredients would have the time to react with respect to the gels and the emulsions.

Although most generally the pressing phase is carried out at room temperature, in some cases it may be useful to first heat the mixture to bring it to around 30° to 35° C., in the case, particularly, of oleaginous products containing a fatty substance of low melting point. Because of this, the fatty material concerned is fluidized and can be easily extracted.

If the product, at the start, is naturally not very moist, it may be useful to adequately humidify it in order to facilitate the extraction. Such is the case, for example, for kola nut, from which the "juice and a kola nut cake" may be readily obtained. In this case, the quantity of added water (at the time of crushing) should naturally be taken into consideration in calculating the quantity of extraction medium which will come into play.

Thus, and definitively, the extraction procedure is easy and does not require special equipment. It is even possible to envisage the processing of products from which straight juices were not habitually extracted such as aromatic plants, medicinal plants, and the like, hence the possibility of opening up new areas of application.

Furthermore, as previously said, juices, oils and cakes are obtained in stable forms. In particular, in the case of oils, it is not necessary to completely dehydrate them as is conventional because the remaining water has been inactivated by the extraction mixture. The same applies for cakes.

Depending on the proportions of sugars and of salt, the products obtained are more or less sweet or more or less salty or neutral. Thus, excellent results can be obtained not only with the usual condimental plants, such as basil, tarragon and the like, but also with algae, and also with reputedly difficult fruits, such as fresh coconut pulp which until now, required the use of powerful machines for relatively modest juice yields, and without observing significant degradations and without resorting to refining. Moreover, the cakes obtained are perfectly acceptable in cooking and in pâtisserie and not, as was hitherto the case, usable only as animal feed or as combustibles or as fertilizer.

The process as claimed in the invention may be applied to any type of product of biological origin, such as fruits, vegetables, aromatic plants, algae, condimental plants, medicinal plants, and also oleaginous products.

Furthermore, the process as claimed in the invention also facilitates the subsequent separation phase, which consists in separating the various constituent elements of the juices obtained from oleaginous products. In fact, it is known that for an oleaginous product this separation of the oily phase, the aqueous phase and the mucilaginous phase is fairly delicate to carry out and sometimes requires the use of complex double centrifugation equipment, as is the case for fresh coconut. In the case of extractions as claimed in the invention, juices which are easy to separate by a simple decantation or by a moderate centrifugation are obtained, as a result of the large density difference between the sweet and salty phases and the aqueous phases of the juices obtained.

Finally the stabilizations obtained by this process can be compared by placing the juices obtained from them under a moderately cold condition (refrigeration) and by them drying, particularly by natural means, the cakes obtained.

The manner in which the invention can be carried out and the advantages which derive from it will emerge better from the following examples of embodiments.

EXAMPLE 1

Into a ten liter stainless steel disk mill is introduced a depressor-extractor system containing:

| Dextrose | 4500 grams | (64%) |
|---|---|---|
| Sucrose | 1400 grams | (20%) |
| Sorbitol | 210 grams | (3%) |
| Salt | 840 grams | (12%) |
| Citric acid | 70 grams | (1%) |
| | 7020 grams | |

In this depressor system, the weight ratio between the dextrose and the sucrose is therefore 3.2 and the weight ratio between the sugars and the salt is 7.27.

This mixture is homogenized by operating the mill, at 2000 revolutions per minute for twenty seconds.

3500 grams of fresh basil at 92% moisture are added at room temperature (weight ratio between the depressor system and the water in the basil is equal to 2.18).

Spinning is then carried out for two minutes at 2000 revolutions per minute. A very green paste is obtained which is left to sit for two hours.

This paste is pressed using an oil-bag press and there is obtained:
5600 grams of a heavy and thick juice (sweet/salty)
4850 grams of heavy cakes (sweet/salty)

The juice obtained is of a nice green color. It has a very good perfume of fresh basil. Bottled, it is ready to use, particularly as a condiment in cooking. The cake, too, is of a very nice green color and, has a very nice basil perfume. It contains 40% moisture. For greater convenience, it is dried on plates in a moderately ventilated atmosphere at 25°/30° C. Nearly 3000 grams of dry product are obtained which is reduced into a powder, ready to use.

EXAMPLE 2

Into a ten liter stainless steel mill is introduced a depressor/extractor system containing:

| dextrose | 1770 grams | (68%) |
|---|---|---|
| sucrose | 600 grams | (23%) |
| sorbitol | 80 grams | (3%) |
| salt | 130 grams | (5%) |
| citric acid | 20 grams | (0.72%) |
| | 2600 grams | |

The weight ratio dextrose/sucrose is therefore

This mixture is homogenized by operating the mill at 2000 revolutions per minute for twenty seconds.

3000 grams of peeled coconut pulp at 43% moisture are added at room temperature.

Thus, the weight ratio between the depressor system and the quantity of water in the coconut is equal to two (2).

Spinning is carried out for two minutes at revolutions per minute and a white paste is obtained which is left to sit for three hours, at a temperature of 30°/35° C.

This paste is pressed using an oil-bag press and there is obtained:
3400 grams of a heavy and thick juice which decants slowly (at a temperature of 30°/35° C.) into:
virgin oil: 1450 grams
protein-containing sweet juice: 1950 grams
1800 grams of heavy cake, granulated, white and sweet.

The virgin oil obtained is white when it solidifies and has an excellent taste and a coconut perfume; it is ready to use.

The cake is white, granulated, still a little fatty and sweet. Dried, it gives about 1100 grams of a very perfumed dry product which is fairly analogous to "grated coconut" with the added advantage of being sweet. This cake is particularly recommended in pâtisserie.

The protein-containing sweet juice is bottled. After dilution, it gives an excellent drink, which is nutritious and has a coconut perfume.

EXAMPLE 3

Into a ten liter stainless steel disk mill is introduced the following depressor/extractor system (sweet formula):

| dextrose | 3100 grams |
|---|---|
| sucrose | 1050 grams |
| sorbitol | 135 grams |
| salt | 225 grams |
| citric acid | 45 grams |
| | 4555 grams |

The weight ratio dextrose/sucrose is therefore 2.95.

This mixture is homogenized by operating the mill at 2000 revolutions per minute for twenty seconds.

2000 grams of kola nut at 50% humidity and 1000 grams of water 50% of the weight of kola are added at room temperature, that is to say a total weight of 3000 grams with an average moisture of 66%. The extraction medium represents 2.3 times the total water.

Spinning is carried out for three minutes at 2000 revolutions/minute and a raspberry-colored paste is obtained, which is left to sit for two hours.

This paste is pressed using an oil-bag press and there is obtained:
- 4300 grams of a heavy and thick juice (sweet)
- 2900 grams of granulated, heavy cakes.

The juice is of a nice raspberry color. It is a syrup which may or may not be filtered, is ready to use after bottling and which may be used as a stimulant directly or in solution.

The cake is sweet and of a nice raspberry color. It is dried and delivered ready to use, as granules or compressed into tablets for chewing or into actual tablets for sucking. It can be used as a stimulant.

EXAMPLE 4

Example 3 is repeated, by replacing 1000 grams of dextrose with as much pure glycerol.

After pressing, a turbid juice is obtained which is clarified by centrifugation. There is then obtained:
- 2600 grams of a heavy cake intended to be mixed in suitable proportions conformable with the legislation, with other food cakes in order to improve their smoothness and render them significantly stimulant;
- 4600 grams of a thick juice which is clarified again by centrifugation; this juice is perfectly suitable for cosmetology.

EXAMPLE 5

Example 4 is repeated by replacing the pressing phase with a centrifugation-drying phase. The same quantity of thick juice is obtained.

The process as claimed in the invention is characterized, relative to processes hitherto utilized, by:
- its simplicity of use and its speed;
- the ease of extraction and separation of the juices obtained;
- the fact that the products are obtained in stable forms;
- the improvement and the valorization of the cakes.

The juices, oils and cakes thus obtained may find numerous outlets in the food sector as well as in cosmetology.

I claim:

1. A process for obtaining juices, oils and cakes in stable forms by the pressing of fresh plant products which comprises the following steps:
   a) placing a quantity of plant products in a container;
   b) adding to the quantity of plant products an extraction medium in an amount from two to two-and-a-half times the quantity of water contained in said products, said extraction medium comprising a mixture of dextrose, sucrose and salt in proportion by weight of the order of three times dextrose, to sucrose and between seven to seven-and-a-half parts of dextrose and sucrose to one part of salt;
   c) subjecting the whole mixture of plant products and extraction medium to a rapid and exhaustive crushing action to obtain a puree;
   d) pressing the puree to obtain juices, oils and cakes in stable form.

2. The process as claimed in claim 1, wherein the plant products are freshly harvested immediately before processing.

3. The process as claimed in claim 1 wherein step c, the rapid crushing of the mixture, is carried out by subjecting the mixture to a shearing action at room temperature.

4. The process as claimed in claim 1, wherein the extraction medium has between one-quarter and one-half of the dextrose replaced by glycerol.

5. The process as claimed in claim 1 further including adding from 2% to 5% of sorbitol and 1% of citric acid to the extraction medium.

6. The process as claimed in claim 1 wherein the extraction medium comprises by weight:
   from 62.5% to 68%, of the mixture of dextrose and glycerol, with a glycerol not exceeding one-third of the mixture,
   from 20 to 23% sucrose
   3% sorbitol
   from 5 to 13.5% sodium chloride,
   1% citric acid,
   the sum of these constituents being equal to 100%.

7. The process as claimed in claim 6 wherein said extraction medium includes said mixture of dextrose and glycerol comprising 64%; the saccharose comprising 20% and the sodium chloride comprising 12%.

8. The process as claimed in claim 1 further including pressing of the puree to extract from it stable juices, oils and cakes, at a temperature lower than 35° C.

9. The process as claimed in claim 8 wherein the pressing step is performed substantially at room temperature.

10. The process as claimed in claim 1 further including restoring the plant products moisture content to substantially fresh cut levels, before placing a quantity thereof in a container.

11. A process for extracting a stable coconut juice, oil and cake which comprises the steps of:
   a) crushing a quantity of fresh coconut pulp;
   b) placing a quantity of crushed coconut pulp in a container;
   c) adding to the quantity of crushed coconut pulp in the container a depressor system in an amount between two and two-and-a-half times the quantity of water container in the crushed container pulp, said depressor system comprising a mixture in proportion by weight of 68% dextrose and glycerol mixture, with the glycerol not exceeding one third, 23% saccharose, 3% sorbitol, 5% sodium chloride and 1% citric acid;
   d) subjecting the whole mixture of coconut product and depressor system to a shear action crushing at room temperature until a puree is obtained;
   e) pressing the puree at a temperature of between 30° C. and 35° C. until a sweet cake and a juice is obtained;
   f) separating said cake and juice into virgin oil and a syrup which are ready to use.

* * * * *

UNITED STATES PATENT AND TRADEMARK OFFICE
CERTIFICATE OF CORRECTION

PATENT NO.  : 5,108,775
DATED       : April 28, 1992
INVENTOR(S) : ROBERT BOUSSER It is certified that error appears in the above—identified patent and that said Letters Patent is hereby corrected as shown below:

Col. 8, line 48, delete "container" and insert --contained--.

Signed and Sealed this

Sixth Day of July, 1993

Attest:

MICHAEL K. KIRK

Attesting Officer     Acting Commissioner of Patents and Trademarks